(12) United States Patent
Chen et al.

(10) Patent No.: US 10,272,937 B2
(45) Date of Patent: Apr. 30, 2019

(54) EXPANDING WHEEL FRAME WAGON

(71) Applicants: Zhaosheng Chen, El Monte, CA (US);
Yishun Chen, El Monte, CA (US)

(72) Inventors: Zhaosheng Chen, El Monte, CA (US);
Yishun Chen, El Monte, CA (US)

(*) Notice: Subject to any disclaimer, the term of this patent is extended or adjusted under 35 U.S.C. 154(b) by 21 days.

(21) Appl. No.: 15/822,434

(22) Filed: Nov. 27, 2017

(65) Prior Publication Data
US 2018/0297622 A1 Oct. 18, 2018

(30) Foreign Application Priority Data
Apr. 13, 2017 (CN) .......................... 2017 1 0242420

(51) Int. Cl.
*B62B 3/00* (2006.01)
*B62B 3/02* (2006.01)
*B62B 5/00* (2006.01)

(52) U.S. Cl.
CPC .............. *B62B 3/025* (2013.01); *B62B 3/007* (2013.01); *B62B 5/0003* (2013.01); *B62B 2205/06* (2013.01); *B62B 2205/123* (2013.01); *B62B 2205/23* (2013.01)

(58) Field of Classification Search
CPC ....... B62B 5/06; B62B 3/04; B62B 2202/404; B62B 3/022; B62B 3/007; B62B 3/02; B62B 1/00
See application file for complete search history.

(56) References Cited

U.S. PATENT DOCUMENTS

| 5,123,665 | A | * | 6/1992 | Levy | ....................... B62B 3/022 |
| | | | | | 211/201 |
| 5,333,893 | A | * | 8/1994 | Chen | ........................ B62B 7/08 |
| | | | | | 108/177 |
| 9,073,564 | B2 | * | 7/2015 | Yang | ......................... B62B 3/02 |
| 9,101,206 | B1 | * | 8/2015 | Chen | ........................ B62B 3/007 |
| 9,211,897 | B2 | * | 12/2015 | Yang | ........................ B62B 3/02 |
| 9,440,668 | B1 | * | 9/2016 | Chen | ......................... B62B 3/02 |
| 9,771,093 | B2 | * | 9/2017 | Horowitz | ................ B62B 3/025 |
| 2010/0090444 | A1 | * | 4/2010 | Chen | ....................... B62B 3/007 |
| | | | | | 280/651 |

* cited by examiner

*Primary Examiner* — John D Walters
*Assistant Examiner* — James J Triggs
(74) *Attorney, Agent, or Firm* — Clement Cheng

(57) ABSTRACT

A folding cart is disclosed, comprising: a frame comprising a front frame and a rear frame which are disposed face to face; a floor assembly, comprising a front frame member and a rear frame member which are hinged to each other and hinged between the front frame and the rear frame; a wheel retracting assembly comprising a rear wheel half-shaft rotary rod, a rear wheel half shaft, a rotary pulling rod, an automatic foot assembly and a rotary connecting bar; an end of the rear wheel half-shaft rotary rod is pivotally connected to the rear frame member, the rear wheel half shaft is disposed at the other end of the rear wheel half-shaft rotary rod for connecting a rear wheel; an end of the rotary pulling rod is pivotally connected to the rear frame member, and the other end is pivotally connected to the rear wheel half-shaft rotary rod to drive the rear wheel half-shaft rotary rod to retract.

10 Claims, 3 Drawing Sheets

EXPANDING WHEEL FRAME WAGON

This application claims international priority from China application number CN201710242420.4 filed Apr. 13, 2017 by the same inventors Zhaosheng Chen and Yishun Chen, entitled Folding Cart, the disclosure which is incorporated herein by reference.

FIELD OF THE INVENTION

The present invention is in the field of folding carts, more precisely, a folding cart which has equal front wheel tread and rear wheel tread.

DISCUSSION OF RELATED ART

The pull cart has been used for transporting groceries, small children, gardening supplies and the like for many centuries. Typically, the cart has a cart bed with a handle and four wheels.

The cart is multi-functional, pedestrian and generally a neighborhood vehicle. Taking the cart on camping trips, to the beach or anywhere would generally require loading it into an automobile. Because the traditional pull cart is not collapsible, the space limitations in a car may sometimes make the transportation of the cart cumbersome and difficult.

As an improvement to the traditional pull cart, a folding child cart as described in U.S. Pat. No. 5,957,482 filed Aug. 30, 1996 provides a cart with a transversely divided in hinged for folding from a flat position for use to a position which the two bed halves are in face-to-face contact for storage. Furthermore, the removable rail modules may be removable for storage. Some carts are capable of folding into a small compact area. For example, it is disclosed in U.S. Pat. No. 6,845,991, filed Mar. 17, 2003 a folding cart that has folding wheels which can be folded for storage such that the entire package appears to fold into a briefcase like module.

The same inventor Chen, Zhaosheng also invented a variety of different folding carts including carts that had table and umbrella attachments. Unfortunately, these prior art carts relied on a folding frame with a pair of leaning bars defining the foldable frame. The leaning bar configuration was not as sturdy. The folding frame also did not lock as well to an unfolded deployed position.

Other folding frames include, for example a three-wheeled, foldable pushcart, by inventor Zhang in U.S. Pat. No. 9,764,754 titled Push Cart, filed Sep. 19, 2017 which has a push cart having an upper and lower frame, a rear wheel assembly, a front wheel assembly and a connection rod linkage, the disclosure of which is incorporated herein by reference. When the Zhang upper frame is flattened with the lower frame, the rear wheels of the become parallel to the upper frame, allowing the folded push cart a decreased volume, making it easily accessible for carrying and storage. Some push carts are also capable of detaching the cart from the wheel assembly. In U.S. Pat. No. 9,221,486 titled Cart, filed Dec. 29, 2015, inventor Fine discusses a foldable push cart that allows the user to remove the cart from the foldable wheel assembly for easier carrying, the disclosure of which is incorporated herein by reference. Even still, other push carts even included a seat for children to use. In U.S. Pat. No. 5,290,049 titled Push Chair/Shopping Trolley, filed Mar. 1, 1994, Inventor Crisp discloses a push cart that contains this seat and where the frame can be folded to reduce the separation between the front and rear wheels so that the front/rear dimension of the push chair is reduced, the disclosure of which is incorporated herein by reference.

SUMMARY OF THE INVENTION

In order to solve the problem in the prior art, an embodiment of the present invention discloses a folding cart comprising:
a frame comprising a front frame and a rear frame which are disposed face to face;
a floor assembly, comprising a front frame member and a rear frame member which are hinged to each other and hinged between the front frame and the rear frame;
a wheel retracting assembly comprising a rear wheel half-shaft rotary rod, a rear wheel half shaft, a rotary pulling rod, an automatic foot assembly and a rotary connecting bar;
an end of the rear wheel half-shaft rotary rod is pivotally connected to the rear frame member, the rear wheel half shaft is disposed at the other end of the rear wheel half-shaft rotary rod for connecting a rear wheel; an end of the rotary pulling rod is pivotally connected to the rear frame member, and the other end is pivotally connected to the rear wheel half-shaft rotary rod to drive the rear wheel half-shaft rotary rod to retract.

In an embodiment of the present invention, the wheel retracting assembly further comprises a half-shaft rotary rod hinge, the rear wheel half-shaft rotary rod is inclinedly disposed at the rear frame member relative to a horizontal plane via the half-shaft rotary rod hinge.

In an embodiment of the present invention, the rear wheel half-shaft rotary rod is a parallelogram formed by bars, the rear wheel half shaft stays in a position parallel to ground during the rotation of the rear wheel half-shaft rotary rod.

In an embodiment of the present invention, the wheel retracting assembly further comprises two sets of expansion rod mechanisms, two ends of each set of expansion rod mechanism are pivotally connected to the rear frame member and the rear wheel half-shaft rotary rod, respectively.

In an embodiment of the present invention, the expansion rod mechanism further comprises a first rod and a second rod which are sleeved, the first rod is connected to the rear frame member, and the second rod is connected to the rear wheel half-shaft rotary rod, when the floor assembly is in a working state, the expansion rod mechanism is retracted, when the floor assembly is in a folding state, the expansion rod mechanism is stretched.

In an embodiment of the present invention, the wheel retracting assembly further comprises an automatic foot assembly and a rotary connecting bar, an end of the rotary connecting bar is hinged to the rear frame member, and the other end of the rotary connecting bar is hinged to the automatic foot assembly, when the rear frame member is folded, the automatic foot assembly extends out to allow the folding cart to stand.

In an embodiment of the present invention, the folding cart further comprises:
a main basket, comprising a front main basket member and a rear main basket member which are hinged to each other and disposed above the front frame member and the rear frame member; two sets of sidewall assemblies, each set comprises a primary sidewall assembly rear floor crossbar support and a primary sidewall assembly front floor crossbar support which are hinged to each other and form certain angle with each other, the primary sidewall assembly front floor crossbar support is hinged to the front frame via the primary sidewall assembly left front sidewall link, and the primary sidewall assembly rear floor crossbar support is hinged to the rear frame via the primary sidewall assembly left rear sidewall link, the primary sidewall assembly rear floor crossbar support and the primary sidewall assembly front floor crossbar support are hinged to each other at a floor crossbar connector, a floor crossbar is connected between two floor crossbar connectors, and the floor crossbar is disposed below the floor assembly; a main basket front left support and a main basket front right support are hinged between primary sidewall assembly front floor crossbar support and the front frame, main basket rear left support and main basket rear right support are hinged between the primary sidewall assembly rear floor crossbar support and the rear frame.

In an embodiment of the present invention, the wheel retracting assembly further comprises a locking mechanism, the locking mechanism is pivotally connected to the rotary connecting bar, and when the folding cart is in a working state, the locking mechanism hooks the floor crossbar, when the locking mechanism is pulled upwardly, the locking mechanism is separated from the floor crossbar and drives the front frame member and the rear frame member to fold relative to each other.

In an embodiment of the present invention, each set of sidewall assembly further comprises a secondary sidewall assembly rear link and a secondary sidewall assembly front link which are hinged to each other, the secondary sidewall assembly rear link is hinged to the front frame, and the secondary sidewall assembly front link is hinged to the rear frame.

In an embodiment of the present invention, the folding cart further comprises a handle, the handle is hinged to the rear frame, and the handle further comprises a handle support upper section and a handle support lower section which are hinged to each other, the handle support upper section is further hinged to a handle extension of the handle, and the handle support lower section is further hinged to the rear frame.

The folding cart disclosed in the present invention has equal front wheel tread and rear wheel tread in the working state. This makes the folding cart move stably in the working state, and also makes the folding cart small-sized after folded by accommodating two tread-reduced wheels in the other two wheels.

Figure 1:
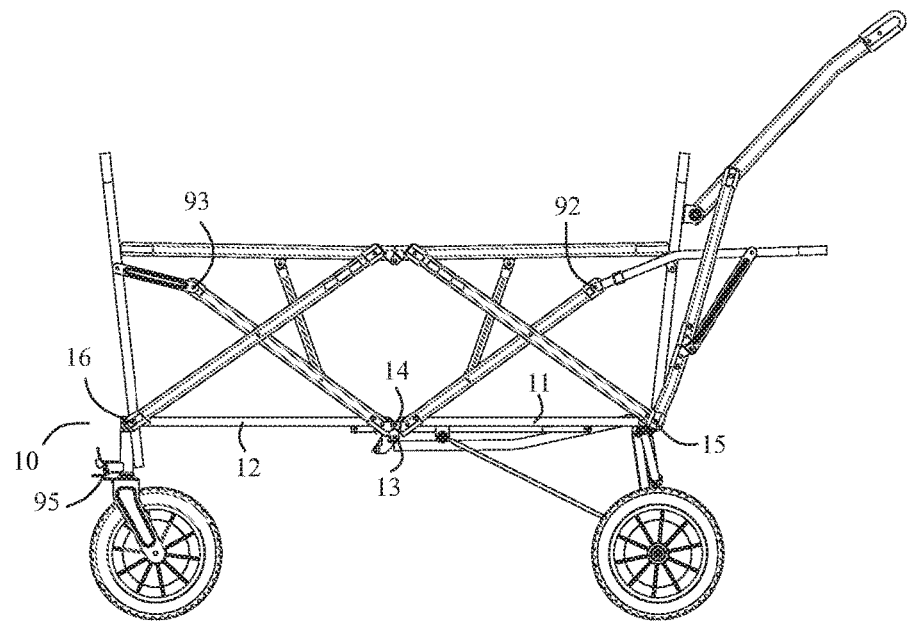
FIG. 1 is a side elevation view of the folding cart.

The following call out list of elements can be a useful guide in referencing the element numbers of the drawings.

| | |
|---|---|
| 10 floor assembly | 30 rear frame |
| 11 rear floor member | 31 left rear frame lower joint |
| 12 front floor member | 32 right rear frame lower joint |
| 13 middle floor joint | 33 left rear frame upper joint |
| 14 floor crossbar | 34 right rear frame upper joint |
| 15 rear floor joint | 35 right rear frame handle joint |
| 16 front floor joint | 36 left rear frame handle joint |
| 108 rotary connecting bar | 37 right rear frame wheel connector |
| 109 locking mechanism | 38 left rear frame wheel connector |
| 19 floor member crossbar | 39 rear frame side vertical member |
| 20 primary sidewall assembly | 40 front frame |
| 21 floor crossbar connector | 41 front frame left lower joint |
| 22 primary sidewall assembly rear floor crossbar supports | 42 front frame right lower joint |
| | 43 front frame left upper joint |
| 23 primary sidewall assembly front floor crossbar supports | 44 front frame right upper joint |
| | 45 front frame upper horizontal member |
| 24 primary sidewall assembly left rear sidewall link | 46 front frame lower horizontal member |
| 25 primary sidewall assembly left front sidewall link | 47 front frame left vertical member |
| 26 primary sidewall assembly right rear sidewall link | 48 front frame Right vertical member |
| 27 primary sidewall assembly right front sidewall Link | 50 handle |
| | 60 secondary sidewall assembly |
| 28 rear basket hoop | 61 secondary sidewall assembly rear Link |
| 29 rear basket hoop supports | |
| 100 wheel retracting assembly | 62 secondary sidewall assembly front Link |
| 51 handle extension | |
| 53 left handle joint | 63 secondary sidewall assembly rear Link joint |
| 54 right handle joint | |
| 55 handle grip | 64 secondary sidewall assembly front Link joint |
| 56 handle cross brace | |
| 57 handle support upper section | 65 secondary sidewall assembly rear Scissor joint |
| 58 handle support lower section | |
| 59 handle support joint | 66 secondary sidewall assembly front Scissor joint |
| 70 main basket | |
| 71 rear main basket member | 67 secondary sidewall assembly middle joint |
| 72 front main basket member | |
| 73 main basket rear left support | 91 primary sidewall middle joint |
| 74 main basket rear right support | 92 primary sidewall rear joint |
| | 93 primary sidewall front joint |
| 75 main basket front left support | 94 wheel pivot |
| 76 main basket front right support | 95 wheel pivot latch |
| | 101 half-shaft rotary rod hinge |
| 77 main basket support upper joint | 102 rear wheel half-shaft rotary rod |
| | 103 rear wheel half shaft |
| 78 main basket support lower joint | 105 rotary pulling rod |
| | 106 expansion rod mechanism |
| 79 main basket middle joint | 107 automatic foot assembly |
| 81 first rear wheel half-shaft rotary rod end | 82 second rear wheel half-shaft rotary rod end |
| 83 first rotary pulling rod end | 84 second rotary pulling rod end |

DETAILED DESCRIPTION OF THE PREFERRED EMBODIMENT

The present invention is a folding cart with a locking floor. The cart has an open configuration when deployed and a folded configuration when stowed. The locking floor folds upward. The folding cart has a folding floor with equal front wheel tread and rear wheel tread. This means the front wheel tread and the rear wheel tread are equal when the floor of the folding cart which has four wheels is in a working state, and the front wheels (or the rear wheels) can accommodate the rear wheels (or the front wheels) when the floor of the folding cart is in a folded state. During the folding processing, the wheel tread between two rear wheels (or front wheels) gradually reduces, and when the extreme folded position, the two rear wheels (or the front wheels) can be accommodated in the space between two front wheels (or rear wheels).

The folding cart disclosed in the present invention mainly includes the following parts: a folding floor assembly 10, a front frame 40, a rear frame 30, a primary sidewall assembly 20, a secondary sidewall assembly 60, a handle 50 and a wheel retracting assembly 100. The parts are illustrated hereinbelow with the accompanying drawings.

The folding cart has a folding floor assembly 10. As called out in FIGS. 1-2, the floor assembly is formed of a pair of panels including a rear floor member 11 and a front floor member 12. The pair of panels are formed as frames of preferably welded tubular steel. When using welded tubular steel, the steel tubular members preferably have a generally rectangular cross-section and a flat upper surface opposing a flat lower surface (that is, two surfaces parallel to the ground are flat).

The rear floor member 11 and the front floor member 12 are defines as below: When a user is pushing the cart, the front is the side away from the user, and when the user is pulling the cart, the front is the end towards the user. Front and rear refer to the direction of travel and invert when the direction of travel is reversed. Therefore, the element names having front and rear designations, can be interchanged when direction of travel is reversed, and they are not used to limit the scope of the present invention.

The rear floor member 11 is hinged to the front floor member 12 at a middle floor joint 13. The middle floor joint 13 can rest on a floor crossbar 14. The position of the floor crossbar 14 is lower than the position of the middle floor joint 13, and the floor crossbar extends from the right side of the cart to the left side of the cart underneath the middle floor joint 13. The middle floor joint 13 is a portion of the folding floor assembly 10 that abuts floor crossbar 14. The floor crossbar 14 is therefore releasably engaged to the folding floor assembly 10.

The middle floor joint 13 can have a locking hinge that unfolds beyond a 180° angle so that the weight of the rear floor member 11 and the front floor member 12 bias the folding floor assembly 10 into a locked position. That is, when folding, the rear floor member 11 and the front floor member 12 rotate relative to the locking hinge, an angle between the plane where the rear floor member 11 locates and the plane where the front floor member 12 locates reduces gradually, until the folding floor assembly 10 is in a folding state.

Instead of the middle floor joint 13 abutting the floor crossbar 14 and supported by the floor crossbar 14 upwardly, the rear floor member 11 or the front floor member 12 could also be on the floor crossbar 14 and supported by the floor crossbar 14. The contact area of any two of rear floor member 11, the front floor member 12, the middle floor joint 13 and the floor crossbar 14 can have an elastomeric cover or surface treatment to improve connection.

The rear floor member 11 is hinged to a rear floor joint 15 and the front floor member 12 is hinged to a front floor joint 16.

Figure 2:
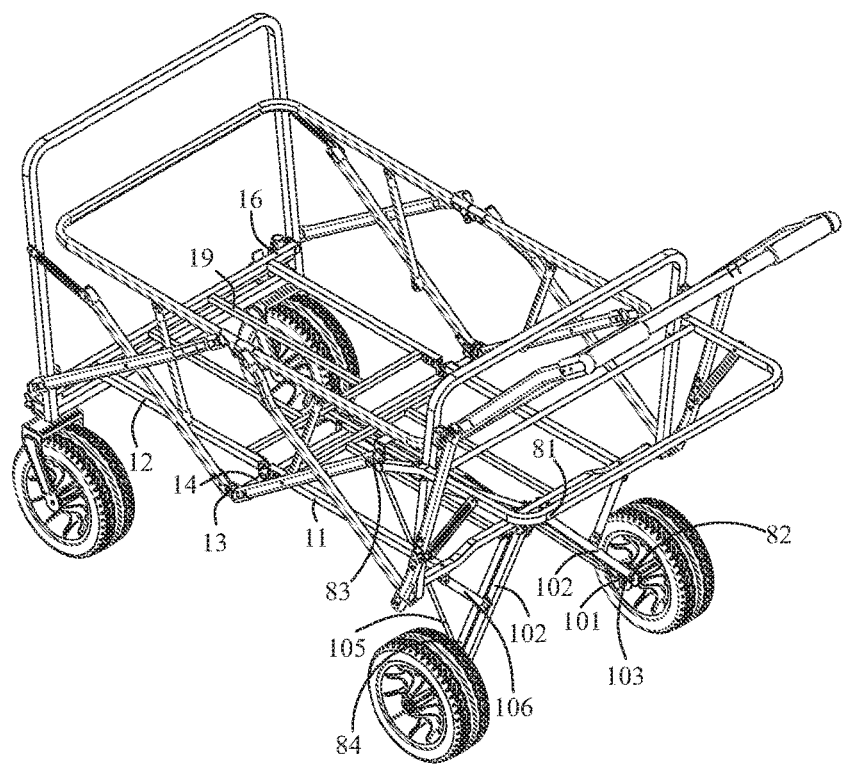
FIG. 2 is a perspective view of the folding cart in open configuration seen from a generally isometric angle.

The folding cart according to the present invention further includes a wheel retracting assembly 100, as shown in FIG. 2, the wheel retracting assembly 100 includes a half-shaft rotary rod hinge 101, a rear wheel half-shaft rotary rod 102, a rear wheel half shaft 103, a rotary pulling rod 105, an expansion rod mechanism 106, an automatic foot assembly 107, a rotary connecting bar 108 and a locking mechanism 109.

Two half-shaft rotary rod hinges 101 which form acute angle with the horizontal direction are assembled on a proper position of the floor assembly 10, the proper position may be the rear end of the rear floor assembly 11. Each of the half-shaft rotary rod hinge 101 is an inclined hinge, the left rear wheel half-shaft rotary rod 102 and the right rear wheel half-shaft rotary rod 102 are assembled on the inclined hinge half-shaft rotary rod hinge 101, therefore the rear wheel half-shaft rotary rod 102 are disposed inclinedly. Each rear wheel half-shaft rotary rod 102 may be parallelogram formed by metal bars, in order to make sure the rear wheel half shaft 103 of the rear wheel stay in a position parallel to the ground during the rotation of the rear wheel half-shaft rotary rod 102. The rear wheels which are the wheels close to the handle assembly are assembled on the rear wheel half shaft 103. Therefore, the half-shaft rotary rods 102 are elongated four bar mechanisms that have a parallelogram shape for maintaining a horizontal position of the wheel axles from the deployed position to the stowed position. Additionally, the rear wheel halfshaft rotary rod 102 has a first rear wheel half-shaft rotary rod end 81, and a second rear wheel half-shaft rotary rod end 82.

The rotation of the rear wheel half-shaft rotary rod 102 is driven by the rotary pulling rod 105 assembled to the floor assembly floor assembly 10 (for example, the relative rear end of the 12), in order to achieve the two extreme positions which are working position and folding position. Two sets of expansion rod mechanisms 106 are disposed between the floor assembly 10 and the rear wheel half-shaft rotary rod 102, the expansion rod mechanisms 106 includes a first rod and a second rod which are sleeved. The two sets of expansion rod mechanisms 106 have a hinged connection to an upper member of the half-shaft rotary rods 102 at approximately a midpoint of the half-shaft rotary rods 102.

The longest state and the shortest state of the expansion rod mechanism 106 correspond to two extreme states of the rear wheel half-shaft rotary rod 102, respectively. When the floor assembly 10 is in a working state, the expansion rod mechanism 106 is in the shortest state, thereby supporting the floor assembly 10 and enhance the loading ability of the floor assembly 10 (for example, the floor assembly 10 can load the weight of 100 kilograms during test). The automatic foot assembly 107 is assembled on the floor assembly 10, the automatic foot assembly 107 is also located in two extreme positions with the movement of the floor assembly 10. When the floor assembly 10 is in a working state, the automatic foot assembly 107 is retracted to avoid interfering the movement of the folding cart, and when the floor assembly 10 is in a folded state, the automatic foot assembly 107 extends out, to make the vehicle may stand by itself.

In an embodiment, an end of the rotary connecting bar 108 is hinged to the floor assembly 10, such as hinged to the rear floor member 11 or the front floor member 12, and the other end of the rotary connecting bar 108 is hinged to the automatic foot assembly 107. The two rotary pulling rods 105 are hinged to the rotary connecting bar 108. The locking mechanism 109 may be fixed to the rotary connecting bar 108 and being rotatable. When the folding cart is in a working state, the locking mechanism 109 is hooked to the floor crossbar 14, and when the locking mechanism 109 is pulled upwardly, the locking mechanism 109 is separated from the floor crossbar 14 and drives the rear floor member 11 and the front floor member 12 to fold relative to each other. Therefore, the rotary connecting bar 108 can be pivotally mounted to the rear floor member 11 or the front floor member 12.

For the rear floor member 11 and the front floor member 12, several floor member crossbars 19 can be welded to form a frame having a planar configuration. The floor crossbar 14 supports the floor assembly 10, but is not a part of the floor assembly 10. Rather, the floor crossbar 14 is a part of the primary sidewall assembly 20.

Figure 3:
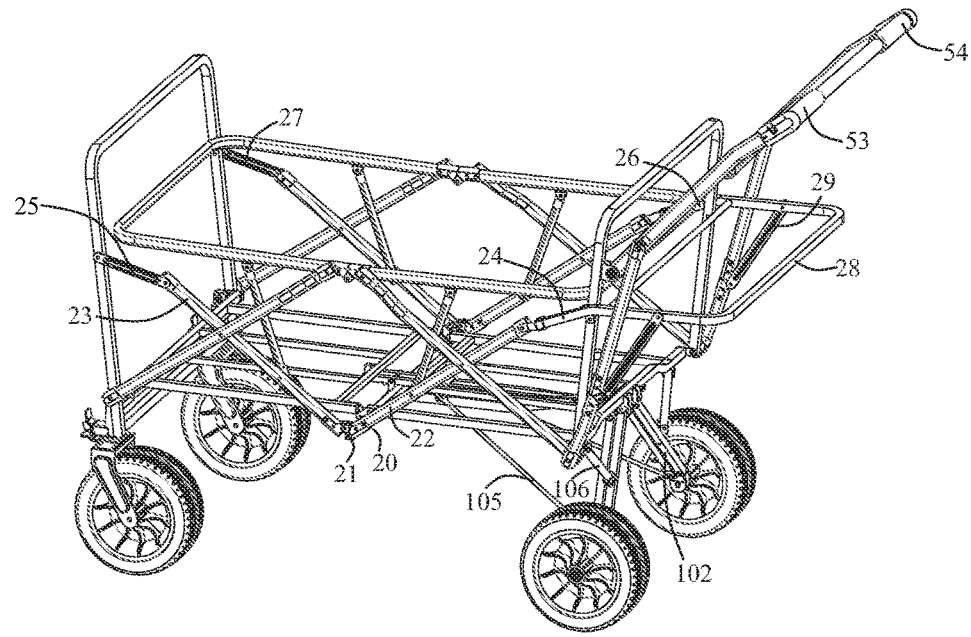
FIG. 3 is a perspective view of the folding cart in open configuration.
Figure 4:
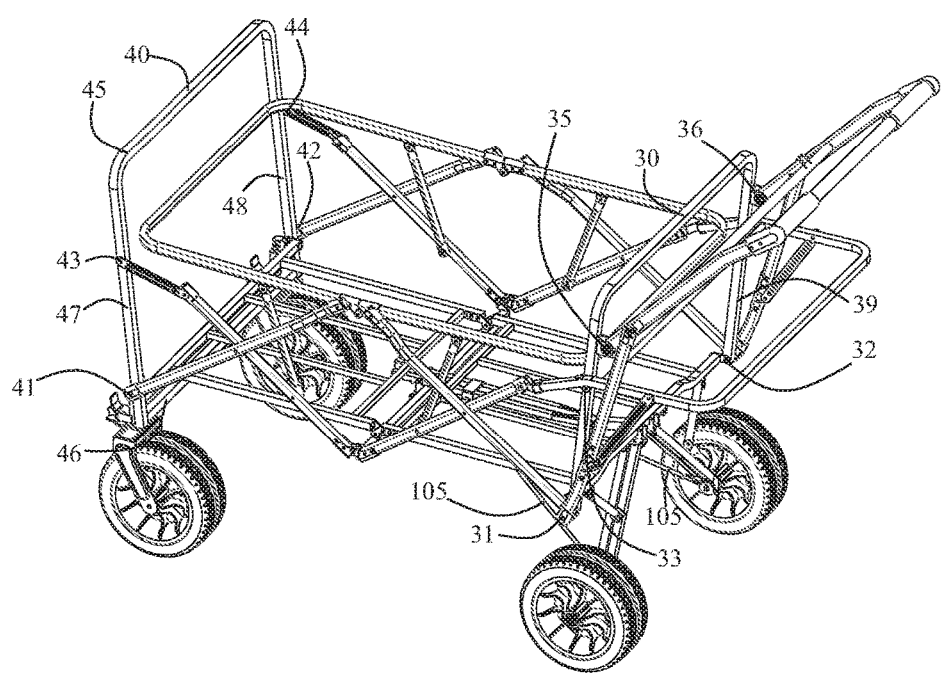
FIG. 4 is a perspective view of the folding cart in open configuration, taken from a higher angle.

As called out in FIGS. 3-4, the primary sidewall assembly 20 connects to the floor crossbar 14 at a floor crossbar connector 21. A pair of primary sidewall assembly rear floor crossbar supports 22 extend diagonally from the floor crossbar connector 21 and connect to a pair of primary sidewall assembly rear sidewall links including a primary sidewall assembly left rear sidewall link 24 and a primary sidewall assembly right rear sidewall link 26.

Similarly, the pair of primary sidewall assembly front floor crossbar supports 23 connect to the floor crossbar connector 21 and extend to a pair of primary sidewall assembly front sidewall links including a primary sidewall assembly left front sidewall link 25 and a primary sidewall assembly right front sidewall link 27. At the rear of the cart, the pair of primary sidewall assembly rear sidewall links extend to a rear basket hoop 28. The rear basket hoop 28 can receive a rear basket hoop fabric basket for stowing articles. The rear basket hoop fabric basket does not touch the foot stand extension crossbar 18.

The rear basket hoop supports 29 are hinged to the rear basket hoop 28. The rear basket hoop 28 is rigidly connected to and preferably integrally formed with the pair of primary sidewall assembly rear sidewall links 24 and 26. The pair of rear basket hoop supports 29 preferably connect to an outside surface of the rear basket hoop 28 in a pivot joint such as a rivet connection. The rear basket hoop supports 29 can be formed of steel elongated bars that are stamped or embossed for resisting torsion.

The rear basket hoop 28 is mounted to the rear frame 30 at a pivoting connection such as a rivet. As called out in FIGS. 3-4, the rear frame 30 has a generally rectangular frame structure with a pair of horizontal members connected to a pair of vertical members. Preferably, the rear frame 30 can be integrally formed of one or two bent tubular metal members. At the very least, a pair of rear frame side vertical members 39 receive a plurality of joints for connection to the sidewalls and the floor assembly 10.

The rear frame 30 has a left rear frame lower joint 31, and a right rear frame lower joint 32 that both pivotally connect to the rear floor member 11 and can also both pivotally connect to the secondary sidewall assembly rear links 61. The rear frame 30 also has a left rear frame upper joint 33 and a right rear frame upper joint 34. The left rear frame upper joint 33 is pivotally connected to and is connected between the primary sidewall assembly left rear sidewall link 24 and the rear basket hoop 28. Similarly, the right rear frame upper joint 34 is pivotally connected to and is connected between the primary sidewall assembly right rear sidewall link 26 and the rear basket hoop 28. Thus, the rear basket hoop 28 pivots upwardly while the pair of primary sidewall assembly rear sidewall links pivot downwardly. The weight of the rear basket hoop 28 locks the pair of primary sidewall assembly rear sidewall links at a nonparallel angle to the primary sidewall assembly rear floor crossbar supports 22. That is, in a non-locking state, the primary sidewall assembly rear floor crossbar support 22 and the primary sidewall assembly left rear sidewall link 24 are not parallel.

The rear frame 30 also has a right rear frame handle joint 35 and a left rear frame handle joint 36 that both connect to the handle 50. The joints of the rear frame 30 are preferably rivet connections on the pair of rear frame side vertical members 39.

The front frame 40 has a front frame left lower joint 41 and a front frame right lower joint 42 that can both pivotally connect to the front floor member 12 and also the secondary sidewall assembly front link 62. The front frame left upper pivot joint 43 is pivotally connected to the primary sidewall assembly left front primary sidewall link 25. The front frame right upper joint 44 is pivotally connected to the primary sidewall assembly right front primary sidewall link 27.

The front frame 40 has generally the same structure as the rear frame 30 including a front frame upper horizontal member 45, above a front frame lower horizontal member 46. A front frame left vertical member 47 and a front frame right vertical member 48 are both connected to the front frame upper horizontal member 45 and the front frame lower horizontal member 46.

Figure 5:
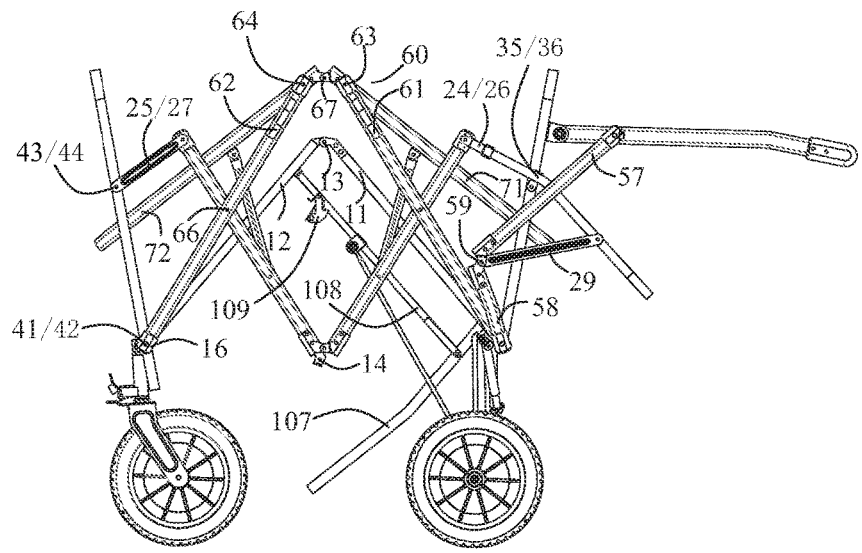
FIG. 5 is a side view of the folding cart in a half folded configuration.
Figure 6:
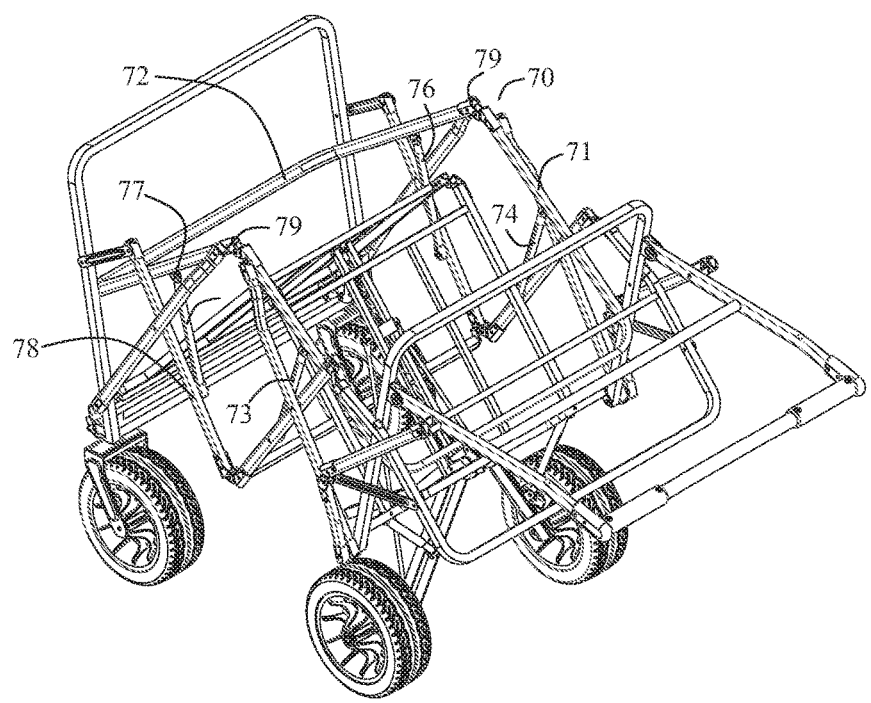
FIG. 6 is a perspective view of the folding cart and a half folded configuration.

The pair of vertical members receive the pivot joints. As seen in the figures and as called out in FIGS. 5, 6 the handle 50 is described previously as pivotally connected to the rear frame 30. The handle 50 has a handle extension 51 that extends from the right rear frame handle joint 35 and the left rear frame handle joint 36. The handle 50 preferably includes a handle grip 55 and a handle cross brace 56 connected across the pair of handle extensions 51. The left handle joint 53 and the right handle joint 54 can be formed as plastic members that have sockets for receiving the pair of handle extensions 51 and coupling the pair of handle extensions 51 to the handle grip 55.

The handle 50 is supported by a handle support that has a handle support upper section 57 and a handle support lower section 58. A handle support joint 59 connects the handle support upper section 57 to the handle support lower section 58. The handle support joint 59 is formed as an elbow joint that locks at a particular angle where the handle support upper section 57 has rotated to near or past 180° from the handle support lower section 58. The handle support lower section is pivotally connected to the rear frame 30. The handle support joint 59 can also be pivotally connected to the rear basket hoop supports 29. The handle support joint 59 can also be characterized as a locking knee joint that locks into place when disposed linearly and bearing weight in a vertical direction. The handle support joint 59 has a limited range of motion that goes from generally parallel to slightly greater than 180°. After the handle support joint 59 rotates past 180°, it locks into place via the force in the vertical direction. When the handle support joint 59 locks into place, the frame of the basket become stable and locked in the deployed position.

The secondary sidewall assembly 60 has a secondary sidewall assembly rear link 61 connected to a secondary sidewall assembly front link 62. The secondary sidewall assembly rear link 61 is pivot jointed to a secondary sidewall assembly rear link joint 63. Similarly, the secondary sidewall assembly front link 62 is pivot jointed to the secondary sidewall assembly front link joint 64. The secondary sidewall assembly rear link joint 63 can be spaced apart from or coincidental with the secondary sidewall assembly front link joint 64.

The primary sidewall assembly forms a V shape and is connected to the secondary sidewall assembly. The secondary sidewall assembly rear link 61 has a pair of secondary sidewall assembly rear scissor joints 65 connecting to the primary sidewall assembly rear floor crossbar supports 22. Similarly, the secondary sidewall assembly front link 62 has a pair of secondary sidewall assembly front scissor joints 66 connecting to the primary sidewall assembly front floor crossbar supports.

As called out in FIG. 8, the primary and secondary sidewall assemblies preferably support a main basket 70. The main basket 70 is formed of a rear main basket member 71 hinged to a front main basket member 72 at a main basket middle joint 79. The main basket middle joint 79 is limited to a 180° angle. The rear main basket member 71 has a main basket rear left support 73 and a main basket rear right support 74. The front main basket member 72 has a main basket front left support 75 and a main basket front right support 76. The main basket supports are pivotally connected at a main basket support upper joint 77 and a main basket support lower joint 78. The main basket support lower joint 78 is mounted to the primary sidewall assembly 20 and the main basket support upper joint 77 is mounted to the main basket 70. The main basket support lower joints 78 of the main basket rear left support 73 and the main basket rear right support 74 are pivotally connected to the primary sidewall assembly rear floor crossbar supports 22 at a location lower than the secondary sidewall assembly rear scissor joints 65. The main basket support lower joints 78 of the main basket front left support 75 and the main basket front right support 76 are pivotally connected to the primary sidewall assembly front floor crossbar supports 23 at a location lower than the secondary sidewall assembly front scissor joints 66.

The primary sidewall middle joint 91 connects the primary sidewall assembly rear floor crossbar supports 22 to the primary sidewall assembly front floor crossbar supports 23. The primary sidewall assembly left rear sidewall link 24 and the primary sidewall assembly right rear sidewall link 26 are pivotally connected to the primary sidewall assembly rear floor crossbar supports 22. The primary sidewall front joint 93 connects the primary sidewall assembly left front sidewall link 25 and the primary sidewall assembly right front sidewall link 27 to the pair of primary sidewall assembly front floor crossbar supports 23.

After taking into consideration all of the structure recited above, the drawings show a system of mechanisms that provide multiple locking joints for maintaining the cart in a deployed position.

The rear frame 30 forms a four bar mechanism with the primary sidewall assembly rear floor crossbar supports 22, the primary sidewall assembly rear sidewall links 24/26, the rear frame side vertical members 39, and the secondary sidewall assembly rear links 61. Analogously, the front frame 40, forms a four bar mechanism with the front crossbar supports 23, the primary sidewall assembly front sidewall links 25/27, the front frame vertical members, and the secondary sidewall assembly front links 62. These four bar mechanisms are located at the rear and front of the cart and are both connected to a middle four bar mechanism which is formed from the connection of the secondary sidewall assembly rear link 61, the secondary sidewall assembly front link the two, the primary sidewall assembly rear floor crossbar supports 22 and the primary sidewall assembly front floor crossbar supports 23. Thus, three connected four bar mechanisms deploy for locking the floor in the deployed position.

In operation, the primary locking mechanism is preferably where the middle floor joint 13 abuts the floor crossbar 14. Then, the three four bar mechanisms of the primary sidewall assembly and the secondary sidewall assembly form a second locking mechanism that secures the primary locking mechanism. Additionally, the folding handle 50 is a third locking mechanism that locks and unlocks with a locking pivot, namely the handle support joint 59. When the handle support joint 59 is in a locked position like a locked knee of a human, the downward weight of the handle 50 retains the rear basket hoop 28, which in turn retains the primary sidewall assembly rear sidewall links 24, 26 which in turn retain the primary sidewall assembly rear floor crossbar supports 22 of the primary sidewall assembly 20. Accordingly, the primary locking mechanism is secured by the secondary locking mechanism which is in turn secured by the third locking mechanism.

Optionally, the wheels can pivot and can have wheel pivots 94. The wheel pivots 94 preferably have wheel pivot locking latches 95 for selective engagement of wheel pivoting function.

As described above, the present invention discloses a folding cart has at least the following advantages as below.

First, the folding cart disclosed in the present invention has a reliable and stable structure, which may achieve a stable locking mode, and has high stability and firmness.

Second, the folding cart disclosed in the present invention has a delicate structure, the space occupied in the folding state is only ¼ of that in an open state, besides, the folding cart can also achieve a self-locking function.

Third, the folding cart disclosed in the present invention has equal front wheel tread and rear wheel tread in the working state. This makes the folding cart move stably in the working state, and also makes the folding cart small-sized after folded by accommodating two tread-reduced wheels in the other two wheels.

The invention claimed is:

1. A folding cart comprising:
a frame including a front frame and a rear frame, wherein the front frame opposes the rear frame;
a floor assembly, comprising a front frame member and a rear frame member, wherein the front frame member is hinged to the rear frame member, wherein the front frame member and the rear frame member are hinged between the front frame and the rear frame;
a wheel retracting assembly including: a rear wheel half-shaft rotary rod, a rear wheel half shaft, a rotary pulling rod, an automatic foot assembly and a rotary connecting bar;
wherein the rear wheel half-shaft rotary rod is pivotally connected to the rear frame member at a first rear wheel half-shaft rotary rod end, wherein the rear wheel half shaft is disposed at a second rear wheel half-shaft rotary rod end, for connecting a rear wheel, wherein the first rear wheel half-shaft rotary rod end is opposite the second rear wheel half-shaft rotary rod end; and
wherein the rotary pulling rod is pivotally connected to the rear frame member at a first rotary pulling rod end, and at a second rotary pulling rod end pivotally connected to the rear wheel half-shaft rotary rod to drive the rear wheel half-shaft rotary rod to retract, wherein the first rotary pulling rod end, is opposite to the second rotary pulling rod end.

2. The folding cart according to claim 1, wherein the wheel retracting assembly further comprises a half-shaft rotary rod hinge, wherein the rear wheel half-shaft rotary rod is inclinedly disposed at the rear frame member relative to a horizontal plane via the half-shaft rotary rod hinge.

3. The folding cart according to claim 1, wherein the rear wheel half-shaft rotary rod forms a four bar mechanism in a parallelogram shape, wherein the rear wheel half shaft stays in a position parallel to the ground during the rotation of the rear wheel half-shaft rotary rod.

4. The folding cart according to claim 1, wherein the wheel retracting assembly further comprises two sets of expansion rod mechanisms, wherein two ends of each set of the expansion rod mechanism are pivotally connected to the rear frame member and the rear wheel half-shaft rotary rod, respectively.

5. The folding cart according to claim 4, wherein the expansion rod mechanism further comprises a first rod and a second rod which are sleeved, wherein the first rod is connected to the rear frame member, and wherein the second rod is connected to the rear wheel half-shaft rotary rod, wherein when the floor assembly is in a working state the expansion rod mechanism is retracted, wherein when the floor assembly is in a folding state the expansion rod mechanism is extended.

6. The folding cart according to claim 1, wherein the wheel retracting assembly further comprises an automatic foot assembly and a rotary connecting bar, wherein the rotary connecting bar is hinged to the rear frame member at a rotary connecting bar first end, and wherein a rotary connecting bar second end is hinged to the automatic foot assembly, wherein when the rear frame member is folded, the automatic foot assembly extends out to allow the folding cart to stand.

7. The folding cart according to claim 1, wherein the folding cart further comprises:
  a main basket, comprising a front main basket member and a rear main basket member which are hinged to each other and disposed above the front frame member and the rear frame member;
  two sets of sidewall assemblies, each set comprising a primary sidewall assembly rear floor crossbar support and a primary sidewall assembly front floor crossbar support which are hinged to each other and form certain angle with each other, the primary sidewall assembly front floor crossbar support is hinged to the front frame via the primary sidewall assembly left front sidewall link, and the primary sidewall assembly rear floor crossbar supports is hinged to the rear frame via the primary sidewall assembly left rear sidewall link, the primary sidewall assembly rear floor crossbar supports and the primary sidewall assembly front floor crossbar support are hinged to each other at a floor crossbar connector, a floor crossbar is connected between two floor crossbar connectors, and the floor crossbar is disposed below the floor assembly;
  a main basket front left support and a main basket front right support are hinged between the primary sidewall assembly front floor crossbar support and the front frame, a main basket rear left support and a main basket rear right support are hinged between the primary sidewall assembly rear floor crossbar supports and the rear frame.

8. The folding cart according to claim 7, wherein the wheel retracting assembly further comprises a locking mechanism which is pivotally connected to the rotary connecting bar, and when the folding cart is in a working state, the locking mechanism hooks the floor crossbar, when the locking mechanism is pulled upwardly, the locking mechanism is separated from the floor crossbar and drives the front frame member and the rear frame member to fold relative to each other.

9. The folding cart according to claim 8, wherein each set of sidewall assembly further comprises a secondary sidewall assembly rear link and a secondary sidewall assembly front link which are hinged to each other, the secondary sidewall assembly rear link is hinged to the front frame, and the secondary sidewall assembly front link is hinged to the rear frame.

10. The folding cart according to claim 8, wherein the folding cart further comprises a handle, the handle is hinged to the rear frame, and the handle further comprises a handle support upper section and a handle support lower section which are hinged to each other, the handle support upper section is further hinged to a handle extension of the handle, and the handle support lower section is further hinged to the rear frame.

\* \* \* \* \*